United States Patent [19]

Johnson et al.

[11] Patent Number: 4,805,073
[45] Date of Patent: Feb. 14, 1989

[54] CABLE TERMINAL BOX CONSTRUCTION

[75] Inventors: Sigurd A. Johnson, Mission Viejo; Howard C. Knott, Huntington Beach; Jerry A. Pederson, Norco, all of Calif.

[73] Assignee: Plan Hold Corporation, Irvine, Calif.

[21] Appl. No.: 151,562

[22] Filed: Feb. 2, 1988

[51] Int. Cl.⁴ .............................................. H02B 1/02
[52] U.S. Cl. .................................... 361/246; 174/52.1
[58] Field of Search ............... 361/346, 358, 362, 334, 361/341, 390, 343, 344; 174/50, 52 R

[56] References Cited

U.S. PATENT DOCUMENTS

| | | | |
|---|---|---|---|
| 1,916,219 | 7/1933 | Hush | 361/358 |
| 2,077,160 | 4/1937 | Wilson, Jr. | 361/334 |
| 3,752,900 | 8/1973 | Harrison et al. | 174/52 R |
| 3,808,504 | 4/1974 | Rabie | 361/358 |
| 4,246,436 | 1/1981 | Hoffman et al. | 361/359 |

*Primary Examiner*—Roy N. Envall, Jr.
*Attorney, Agent, or Firm*—Poms, Smith, Lande & Rose

[57] ABSTRACT

A weather and tamper resistant multi-unit cable terminal box construction comprising a support structure for a terminal board adapted to be vertically positioned and mounted on a supporting wall, an enclosure or cover for covering and enclosing the front, top, and sides of said support structure; a hinge for moving said enclosure to open and closed position about a horizontal axis at the top of said support structure, said hinge being assembled by sidewise movement of the enclosure while in raised position along said horizontal axis, the sides of said support structure having spaced flanges for reception of side walls of said enclosure to enhance weather resistance of said box construction, said support structure having a bottom wall portion extending forwardly for slidably mounting cable pass-through plates and including a lock strike beam, said enclosure having a bottom wall portion extending rearwardly to abut said cable pass-through plates in closed position to lock said plates in position, the front wall of said enclosure carrying lock means for engagement with said lock strike beam, and spring biased transversely movable bolts carried by a forwardly extending top wall of said support structure for interlocking engagement with openings in the side walls of said enclosure to retain said enclosure in raised position to provide free access to the terminal board carried by the support structure.

13 Claims, 4 Drawing Sheets

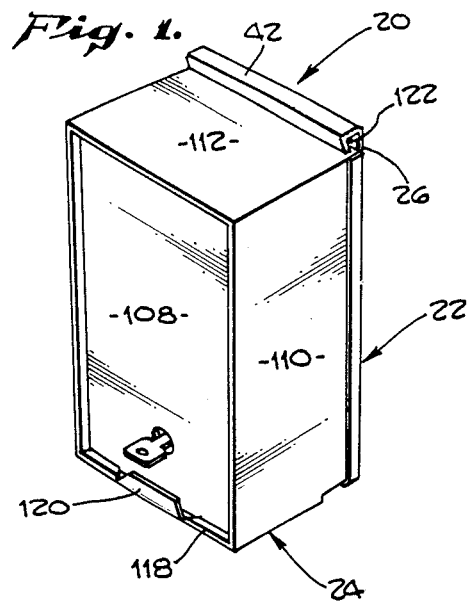
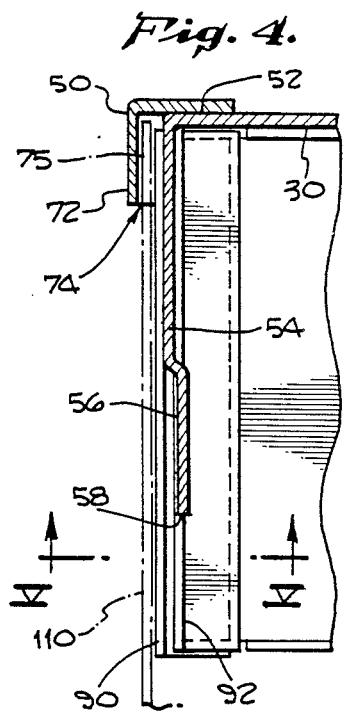
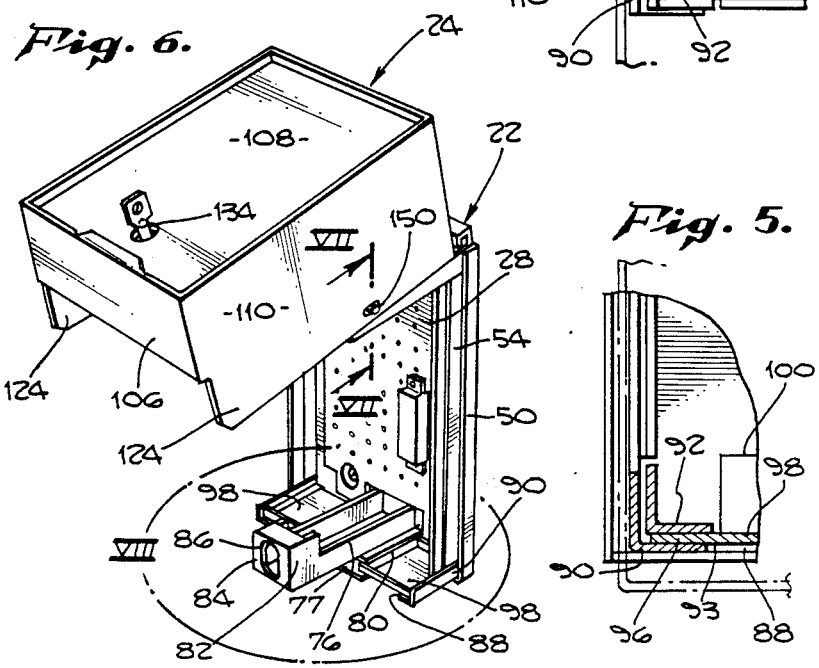
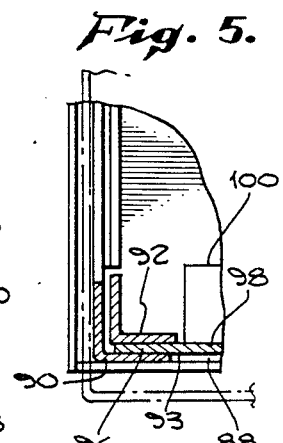

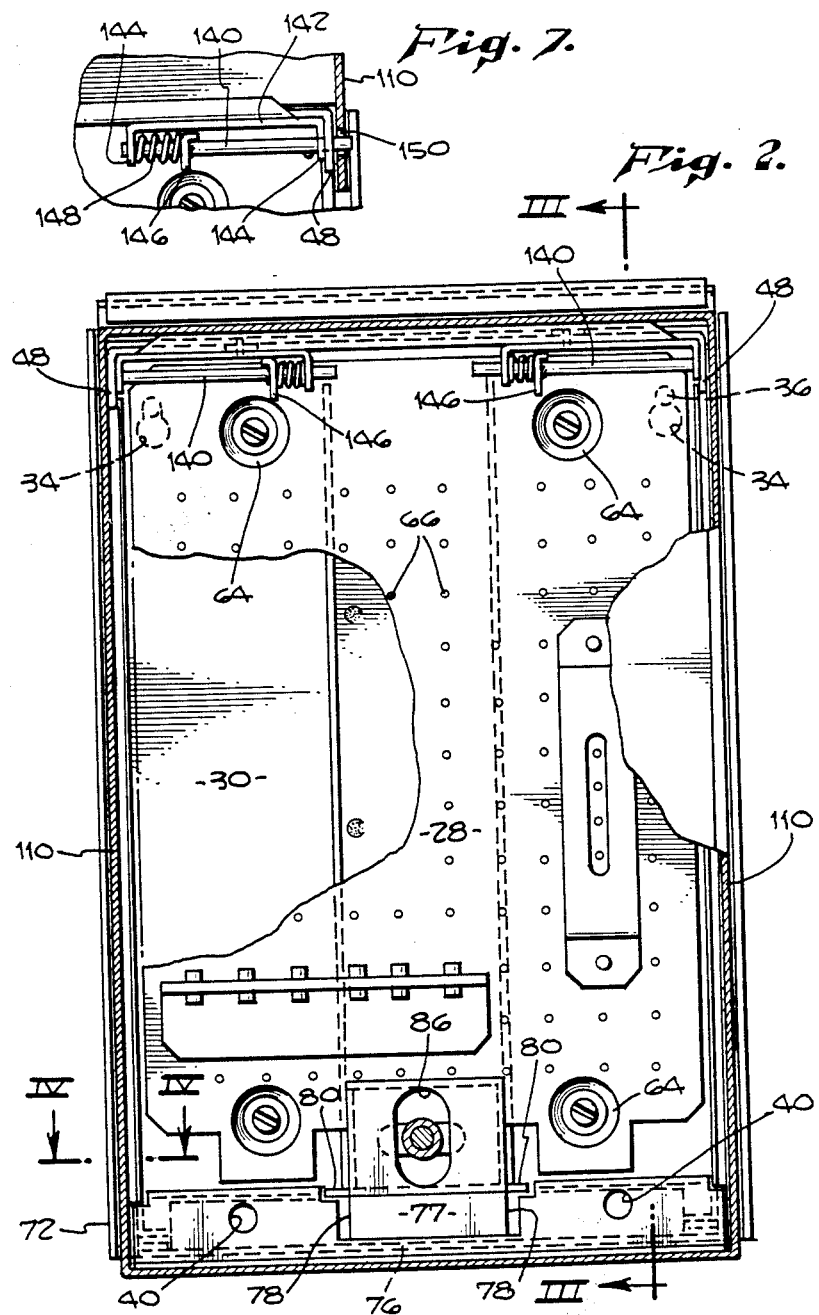

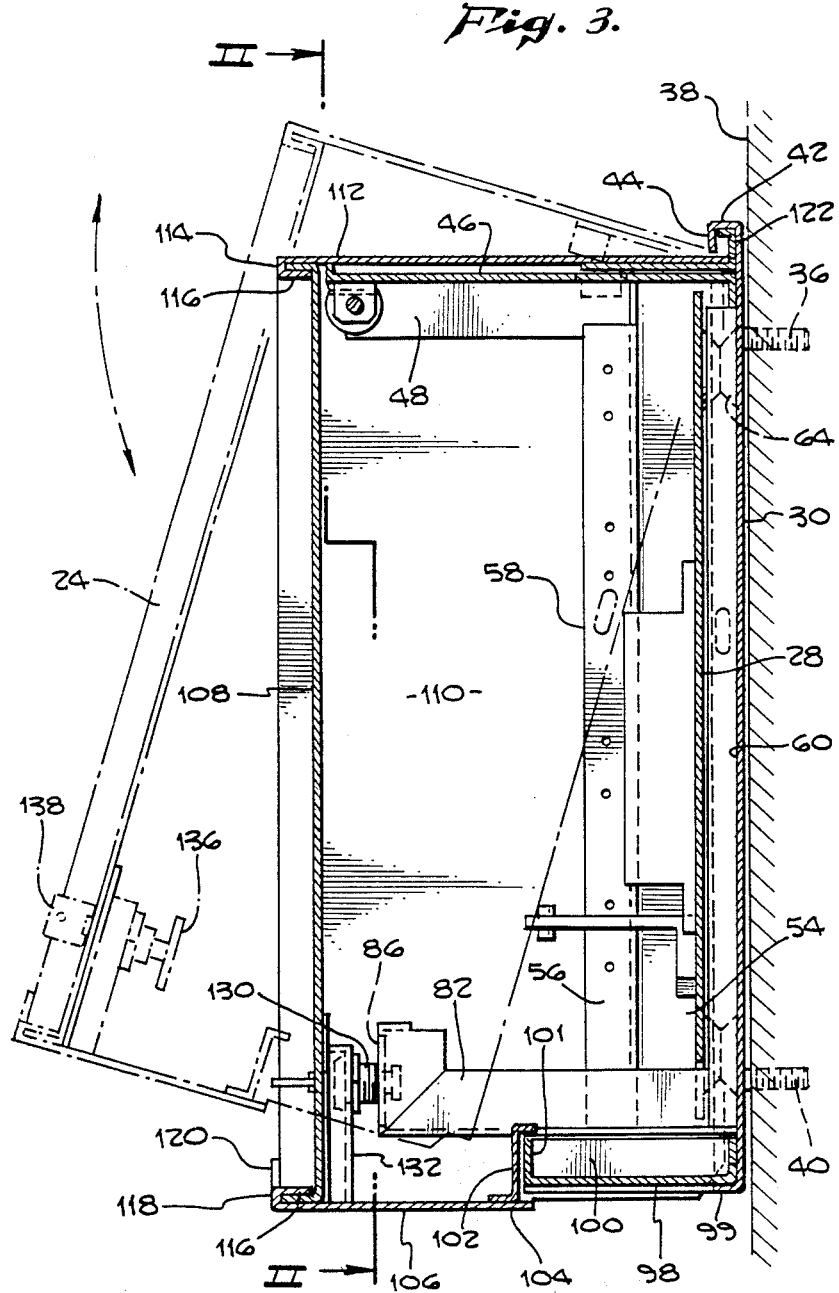

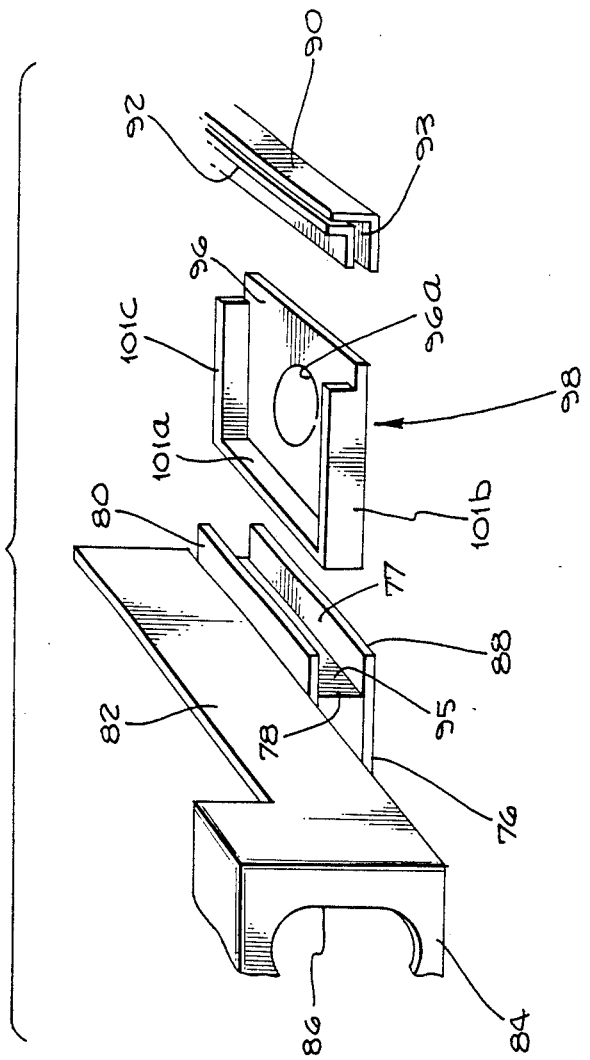

CABLE TERMINAL BOX CONSTRUCTION

BACKGROUND OF INVENTION

This invention relates to a multiple dwelling unit cable terminal box construction utilized for controlling and protecting specific selected television cables carrying television channels to be received by subscribers in a multiple dwelling unit. Prior proposed boxes for this purpose are difficult to mount because of their bulk and weight, and access to their interior is inconvenient. Such multiple cable boxes are often mounted high, such as eight to ten feet, on a multiple unit building wall in order to place the box out of reach and to reduce or make difficult tampering with the box and the cable connections therein. Prior proposed covers for cable terminal boards required complete cover removal. Covers are made of a relative heavy metal such as steel and removal of such a heavy cover and then carrying the heavy cover to the ground level became hazardous.

Prior proposed cable terminal boxes were subject to tampering by prying the cover open with a crowbar or by hitting and smashing various parts of the prior proposed cover construction to gain access to the interior. In some prior proposed installations, the terminal boxes comprised two nested boxes with an outer box removable and detachable from the other box. Because of the height of the side walls of the box within which the terminal board was mounted, it was difficult to have complete freedom of access to the terminal connections and working on such prior proposed boxes was awkward and inconvenient.

SUMMARY OF INVENTION

The present invention relates to a novel, simplified cable terminal box construction which includes enhanced security features to resist tampering and enchanced weather-resistant features to prevent entry of rain, water or moisture into the box construction. The cable box construction of this invention is designed to facilitate working with cable connections within the box. The box of this invention is so constructed and arranged as to facilitate installation on a supporting wall structure and to facilitate assembly of a cover or enclosure means for the box support structure after its attachment to a wall.

One of the objects of the present invention is to provide a cable terminal box construction wherein an enclosure or cover means is readily assembled with the box support structure by a novel hinge means and wherein the cover means is readily moved and locked in full open position to provide convenient accessibility to the interior of the box and the cable terminal connections therein.

Another object of the invention is to provide a cable terminal box construction which is so constructed and arranged as to be weatherproof or weather-resistant and to prevent entry of moisture into the box by a novel arrangement of parts of the box construction.

Another objection of the invention is to provide a cable terminal box construction which may be readily installed, mounted on a supporting wall structure, and assembled.

A further object of the invention is to provide a cable terminal box construction so arranged to resist tampering as by prying with a crowbar and to resist destruction by hitting with a crowbar or other tools.

Another object of the invention is to provide in a cable box terminal construction, as mentioned above, a novel arrangement for maintaining the box in open position and for releasing said box from said open position for movement to closed position.

Various other objects and advantages of the present invention will be readily apparent from the following description of the drawings in which an exemplary embodiment of the invention is shown.

BRIEF DESCRIPTION OF THE DRAWINGS

In the drawings,

FIG. 1 is a perspective view of a cable terminal box construction embodying this invention.

FIG. 2 is an enlarged sectional view taken in the vertical planes indicated by line II—II of FIG. 3, a portion of the terminal board being broken away.

FIG. 3 is a vertical sectional view taken in the plane indicated by line III—III of FIG. 2, the phantom lines showing the cover or enclosure in partially raised position.

FIG. 4 is an enlarged horizontal fragmentary sectional view taken in the plane indicated by line IV—IV of FIG. 2.

FIG. 5 is a sectional view taken in the plane indicated by line V—V of FIG. 4.

FIG. 6 is a perspective view of the box construction of this invention with the cover or enclosure in raised, open position.

FIG. 7 is a fragmentary, enlarged sectional view taken in the plane indicated by line VII—VII of FIG. 6.

FIG. 8 is a fragmentary exploded perspective view of a cable pass-through plate and guide means therefor in the area indicated by phantom circle VIII in FIG. 6.

DETAILED DESCRIPTION OF THE INVENTION

In FIG. 1 of the drawigs, an exemplary embodiment of a cable terminal box construction embodying this invention is generally indicated at 20. Box construction 20 generally comprises a back support structure or wall 22 and an enclosure, cover, housing means 24. The enclosure 24 is hinged about a horizontal axis 26 at the top of support structure 22 and at the back top edge of enclosure means 24. Enclosure means 24 may be raised to full open position as shown in FIG. 6 and held in such position by retaining means later described. It will be apparent from FIG. 6 that the interior of the box construction which includes a terminal board 28 is readily accessible to a cable man working on cable connections therein. The high security features of the box construction 20 will be commented upon hereafter in the detailed description of the co-action in structure between the support structure 22 and the enclosure means 24.

Support structure 22 is best viewed in FIGS. 6, 2, and 3. Support structure 22 includes a rectangular back wall 30 provided with spaced keyhole-shaped openings 34 in the top portion of the back wall for reception of hanger bolts or screws 36 fastened in a wall of a building or other supporting means 38. The keyhole-shaped openings 34 permit the support structure 22 to be raised, the heads of screws 36 passing through the enlarged openings of the key-shaped opening 34. The structure is then lowered so that each bolt is contained in the narrow part of the keyhole-shaped opening. Support structure 22 may be further secured by a pair of bottom screw bolts 40 adjacent the bottom of the back wall for fixedly retaining the back wall on the supporting means 38.

The back wall 30 may be formed from a single sheet of metal such as steel plate, and at its top portion is formed with a top channel return flange 42, FIG. 3, having a slightly rearwardly downwardly inclined lip 44 defining a transverse passageway providing the horizontal hinge axis 26. Spaced below the edge of lip 44 is a forwardly extending top wall 46 having side flanges 48 depending therefrom. At the forward margin of top wall 46 are mounted means for holding and retaining the enclosure means 24 in raised position as later described.

Along vertical side edges of back wall 30 may be angle section edge members 50, FIG. 4, welded to the back wall surface at 52 and extending the entire height of the back wall. Inboardly of angle section members 50, back wall 30 may be formed to provide along each side edge an inboard side flange 54 having an inboardly offset edge portion 56.

The edge 58 of flange 54 is spaced a relatively short distance from the front surface 60 of a terminal board 62 which is secured in spaced parallel relation to the back wall 30 by suitable securement means 64. The terminal board 28 is provided with a selected pattern of spaced perforations 66 to accommodate usual terminal connection devices. Two of such terminal connection devices are generally indicated at 68 and 70, the details of which are not part of this invention. As best shown in FIG. 4, the spacing between the side leg 72 of angle section 50 and the outboard surface of flange 54 provides a channel-like space 74 which readily receives an edge margin 75 of the enclosure means 24 as later described.

Extending forwardly from the bottom portion of the back wall is formed a central plate 76 (FIG. 2). Plate 76 supports upstanding front and side walls 77 and 78 spaced inboardly of side edges of plate 76. Side walls 78 have out-turned side flanges 80 forming with plate 76 guide means as later described. Welded to walls 77 and 78 is a forwardly extending lock strike beam 82 which terminates in an end vertical wall 84 having a latch receiving opening 86.

On each side of the central plate 76 and walls 78 are provided openings 88, FIG. 8, which are defined at their outboard sides by a pair of nested angle section spaced members 90 and 92 secured respectively to the flanges 56 and 54, the angle section members 90 and 92 extending forwardly from, and are secured to, the back wall 30. The spacing of the nested angle section members 90 and 92 provide between their horizontally disposed legs a slot 93 extending from the front to rear for slidable guiding reception of a side margin 96 of a bottom wall 98 of a cable pass through plate 100. Side flanges 80 and margins of plate 76 form opposite slots 95 to provide guide means or ways for an opposed wall 101a of the plate 100.

Plate 100 is provided with peripheral side walls 101a, b, and c except on the side of the side margin 96. Cable pass-through plates 100, when the enclosure means 24 is in raised position are adapted to be slidably removed or inserted into slots 93, 95 to provide for entry and exit of cables into the interior of the box construction. In assembled position in opening 88, the cable plate has a back peripheral wall 101c adapted to abut back wall 30 and has an opposite peripheral wall section 101b adapted to abut web 102 of a Z-section transverse member 104 welded to a bottom wall portion 106 of the enclosure means. Such abutments, when the enclosure means is in closed position, securely retains the cable pass-through plates in the box construction.

The enclosure or cover means 24, FIG. 3, comprises in addition to bottom wall portion 106 a rectangular front wall 108, side walls 110 and a top wall 112. To enhance the security of the enclosure or cover means 24, the walls 110 and 112 are integral and along the front edge portions thereof are provided with an overfold 114, FIG. 3, to receive forwardly directed peripheral edge flanges 116 of front wall 108. Bottom wall 106 is similarly provided with an overfold edge portion 118 to receive the peripheral flange 116 of the front wall. In this example, the center portion of overfold portion 118 of the bottom wall is vertically disposed to provide a handle for the cover.

Top wall 112 is provided with an upstanding angle return lip 122 adapted to nest within the opening provided by the channel return flange 42 and to provide the hinge means along horizontal axis 26. Since channel return flange 42 is open at both ends, it will be readily apparent that when the cover 24 is in a raised position at one side of structure 22 and beyond the raised position in FIG. 6, that the cover may be sidewardly moved so that angle flange 122 enters and is received within channel passageway provided by the return 42. The cover may be sidewardly moved in this upper raised position until it is aligned with the supporting structure and then lowered to closed position with the angle flange 122 fully received within the return 42.

To facilitate pivotal movement about the horizontal axis thus formed by the inter-nesting of angle flange 122 with channel return 42, the lip 44 of return 42 may be inclined slightly downwardly and rearwardly to an angle of approximately 15° to the vertical so that raising action of the cover about the horizontal axis will be unobstructed by the nesting arrangement of the flange 122 and return 42.

To enhance the weather-resistance of the enclosure, longitudinal edge portions 124 of side walls 110 are sandwiched within or interleaved with the flange 72 and the inboard flange 54 of the supporting structure 22 adjacent the back wall 30. Such interleaving extends to the bottom wall portion 98 of the support structure. Thus, along the back top edge and the back side edges of the box construction the nesting and/or interleaving of the edges of the enclosure with flange means provided on the supporting structure provides an effective weather-resistant construction.

Bottom wall portion 106 extends rearwardly in closed position to underlie the bottom plate 76 on the supporting structure and also the forward portions of the cable pass-through plates 98. As mentioned above, the plates 98 are locked in position when the cover is fully closed by abutment of the Z-section bar 102 with the forward walls 101b of plates 98.

Means for locking the enclosure means 24 in closed position to the supporting structure is provided by a suitable cylindrical lock means 130 carried by an internal plate 132 welded to bottom wall portion 106 and front wall 108. Front wall 108 is provided with an opening 134 to provide access to lock means 130 which has been recessed or spaced behind the plane of wall 108. Lock means 130 is provided with a transverse latch bar 136 which is movable into a vertical position for passage through opening 86 in lock strike beam 82 and is movable into a transverse locked position by the key 138. It is important to note that the recessing of the lock 130 behind the front wall 108 severely restricts accessibility for tampering with the lock and that the lock strike beam 82 welded to the back wall 30 and extending forwardly for reception of the latch 136 locks enclosure 24 to the supporting structure in a virtually non-tamper proof manner.

The terminal box construction of this invention facilitates installation of cables and working on cable connections within the box. When the enclosure means 24 is raised about the horizontal hinge axis to a position shown in FIG. 6, means are provided on the supporting structure and on the enclosure means 24 for automatically retaining the enclosure means in such raised position. As best seen in FIGS. 2 and 7, the top wall 46 of the supporting structure is provided adjacent its front edge portion with a pair of retaining bolts or pins 140 disposed transversely of the box construction and carried by elongated U-shaped brackets 142 having downwardly extending end walls 144 having aligned openings therein to receive the pins 140. Intermediate ends of the U-shaped bracket 142, each pin is provided with a stop element 146 serving as a seat for one end of a biasing spring 148 contained between inboard end wall 144 and stop 146. Outboard ends of the pin 140 have sufficient length to extend beyond wall 48 for reception within an opening 150 provided in side wall 110. When the enclosure means 24 is raised to open position, the lock pins 140 will snap outwardly into the openings 150 in the walls 110 for retaining the box cover in such raised position.

Release of the box cover means 24 from its raised position is readily accomplished by squeezing the stops 146 fixed to the lock pins 140 to retract the outboard end faces of pins 140 from the openings 150. Upon such release and lowering of the box cover, the ends of the pins slide along the interior surface of the side walls 110 until the cover 24 is closed.

As mentioned above, installation of the cable terminal box construction of this invention is readily accomplished. On selection of the location of the bolts 36 in a wall of a building, supporting structure 22 may be readily hung from the headed ends of such bolts and the back wall 30 further secured by bolts 40. The enclosure means 24 is then raised to an upper position alongside and above the supporting structure and moved sidewise to insert and pass laterally the upstanding angle flange 122 within the channel return flange 42 of the supporting structure. When the enclosure has been vertically aligned with the supporting structure, the enclosure may be lowered into fully closed position or, if desired, may be lowered sufficiently to interlock the pins 140 with the openings 150 in the side walls 110. In such open position of the enclosure means 24, the cable pass through plates 98 may be withdrawn from the supporting structure and the knock-out disks 96a may be removed to permit passage therethrough of a cable to the interior of the supporting structure. The necessary cable connections may be readily made because the forwardly extending side flanges 54 and 56 of the supporting structure do not interfere with manual manipulation of cable connections or components which are to be secured to the terminal board 28. It is not necessary that the cable pass through plates 98 be in assembly with the supporting structure during this time as long as the cable extends through the knock-out opening. When the connecting work is completed, a cable plate 98 may be raised and slidably guided along the guide means provided on the supporting structure into assembled position therewith as shown in FIG. 3. Closing of the cover 24 securely retains the cable plates 98 in place. In upper position, as shown in FIG. 6, it will be readily apparent that the terminal board is fully accessible for installation purposes.

The supporting structure 22 and the enclosure means 24 are preferably made of relatively heavy steel plate to resist tampering or damage by heavy tools. The arrangement of flanges and the recessing of the lock means severely restricts unauthorized access to such cable installation by severely limiting areas or structured features adapted to receive a prying tool.

It will be readily apparent from the above description that various changes and modifications may be made in the construction of the cable terminal box of this invention and which may fall within the spirit of this invention and all such changes and modifications falling within the scope of the appended claims herein embraced thereby.

We claim:

1. In a multi-unit cable terminal box means, the combination of:
    a support structure for a terminal board, said structure being adapted to be vertically positioned on a support means;
    an enclosure means for enclosing the front, top, sides, and a bottom portion of said support structure;
    hinge means on said support structure and on said enclosure means for pivoting said enclosure means to open and closed position about a horizontal axis adjacent the top of said support structure,
    said hinge means providing assembly of said enclosure means with said support structure by sidewise movement of said enclosure means which in raised position along said horizontal axis;
    said support structure having a bottom wall portion extending forwardly;
    said enclosure means having a bottom wall portion extending rearwardly to cooperate with said support structure bottom wall portion for closing the bottom of said box construction;
    lock means including a forwardly extending lock strike beam on said support structure and a lock device carried on said enclosure means cooperable with said lock strike beam;
    said support structure having a forwardly extending top wall portion;
    releasable biased transversely arranged retaining pins carred by said support structure top wall portion; and
    means on said enclosure means cooperable with said retaining pins for holding said enclosure means in upper raised position for access to the interior of said box means.

2. A box means as claimed in claim 1 wherein
    said hinge means includes a forwardly directed channel-like return flange on said support structure;
    and an upwardly extending L-section flange on said enclosure means adapted to be received within the return flange on said support structure for pivotal movement about said horizontal axis.

3. A box means as claimed in claim 1 wherein said support structure includes forwardly extending parallel flanges at each side defining a side channel;
    said enclosure means having side walls having edge margins receivable within said side channels.

4. A box means as claimed in claim 3 wherein the inboard flange of said pair of flanges has a width dimension greater than said outboard flange.

5. A box means as claimed in claim 1 wherein said bottom wall portion of said support structure includes forwardly extending guide means;

and cable pass-through plates receivable in said guide means for positioning in said box means.

6. A box means as claimed in claim 5 wherein said bottom wall portion of said enclosure means having means abutting said cable pass-through plates for retaining said plates in position when said enclosure means is in closed position.

7. A weather and tamper resistant cable terminal box construction for multiple cables comprising:

a back support wall;

forwardly extending spaced parallel side flanges along opposite side edge portions of said back wall;

forwardly extending bottom flanges providing guide means a cable pass-through plate slidably received in said guide means;

a top forwardly extending return flange at the top of the back wall;

an enclosure having top, side and front walls, said top wall having an upwardly extending return flange slidably engagable and receivable endwise within said top return flange on said back wall to provide a hinge mounting for said enclosure;

said enclosure side walls being receivable within said spaced side flanges on said back wall;

and retaining means on said box construction adjacent said side flanges cooperable with means on said enclosure side walls for releasably holding said enclosure in raised position about said hinge means for access to the interior of the box construction.

8. A weather and tamper resistant cable terminal box construction for multiple cables comprising:

a back support wall;

forwardly extending spaced parallel side flanges along opposite side edge portions of said back wall;

forwardly extending bottom flanges providing guide means adapted to slidably receive a cable pass-through plate;

a top forwardly extending return flange at the top of the back wall;

an enclosure having top, side and front walls, said top wall having an upwardly extending return flange slidably engagable; and receivable endwise within said top return flange on said back wall to provide a hinge mounting for said enclosure;

said enclosure side walls being receivable within said spaced side flanges on said back wall;

and retaining means on said box construction adjacent said side flanges cooperable with means on said enclosure side walls for releasably holding said enclosure in raised position about said hinge means for access to the interior of the box construction;

said retaining means includes transversely disposed spring loaded bolts supported from said top wall and movable for locking engagement with said means on said enclosure side walls.

9. A construction as claimed in claim 8 wherein said means on said enclosure side walls includes slots for reception of ends of said bolts.

10. A weather-resistant multi-cable terminal box comprising in combination:

back support means adapted to be mounted to a supporting means;

a cover for front, top and sides of said back support means;

hinge means on said cover and back support means at the top thereof including inter-leaved return flanges on said back means and on said cover;

said cover and back means having inter-leaved side wall portions;

and retaining means on said back support means engagable with means on said cover for releasably holding said cover in open positon about said hinge means;

said back support means and cover each include bottom wall portions adapted to overlap each other;

the bottom wall portion of said back support means includes guide means, and cable pass-through plate means slidably received in said guide means.

11. A box as claimed in claim 10 wherein the bottom wall portion of said cover includes means for locking said plate means in said guide means when said cover is closed.

12. A terminal box as claimed in claim 10 including a lock strike means supported from said back support means;

said cover including a front wall;

and a lock actuating means in spaced relation to said cover front wall for cooperation with the lock strike means.

13. A terminal box as claimed in claim 10 including a terminal board supported from said back support means in spaced relation thereto.

* * * * *